(12) United States Patent
Ding et al.

(10) Patent No.: US 12,459,750 B2
(45) Date of Patent: Nov. 4, 2025

(54) THREE-DIMENSIONAL CONVEYING DEVICE AND METHOD FOR PLATE GLASS PRODUCTION LINE

(71) Applicant: CHINA TRIUMPH INTERNATIONAL ENGINEERING CO., LTD., Shanghai (CN)

(72) Inventors: Honghan Ding, Shanghai (CN); Rui Liu, Shanghai (CN); Ming Cheng, Shanghai (CN); Chunxiao Li, Shanghai (CN); Peiguang Yang, Shanghai (CN); Ying Feng, Shanghai (CN); Kun Yang, Shanghai (CN)

(73) Assignee: China Triumph International Engineering Co., Ltd., Shanghai (CN)

( * ) Notice: Subject to any disclaimer, the term of this patent is extended or adjusted under 35 U.S.C. 154(b) by 294 days.

(21) Appl. No.: 18/020,350

(22) PCT Filed: Oct. 27, 2021

(86) PCT No.: PCT/CN2021/126587
§ 371 (c)(1),
(2) Date: Feb. 8, 2023

(87) PCT Pub. No.: WO2022/089462
PCT Pub. Date: May 5, 2022

(65) Prior Publication Data
US 2023/0312261 A1    Oct. 5, 2023

(30) Foreign Application Priority Data
Oct. 27, 2020   (CN) .......................... 202011167905.X

(51) Int. Cl.
*B65G 39/12*      (2006.01)
*B65G 47/64*      (2006.01)
(Continued)

(52) U.S. Cl.
CPC ........... *B65G 39/12* (2013.01); *B65G 47/643* (2013.01); *B65G 49/061* (2013.01); *B65G 57/112* (2013.01); *B65G 69/24* (2013.01)

(58) Field of Classification Search
None
See application file for complete search history.

(56) References Cited

U.S. PATENT DOCUMENTS 6,557,724 B1 *   5/2003   LeCroy ................ B65G 47/647
                                               198/463.3
6,976,574 B2 *   12/2005  Franz ................... B65G 49/067
                                               414/793
(Continued)

FOREIGN PATENT DOCUMENTS

CN     102556681 A     7/2012
CN     104058241 A     9/2014
(Continued)

*Primary Examiner* — Kavel Singh
(74) *Attorney, Agent, or Firm* — IPRTOP LLC

(57) ABSTRACT

A three-dimensional conveying device and method for a plate glass production line relate to the technical field of glass production. The device includes: a plate receiving device, arranged at a tail end of an original plate production line; a vertical height-adjustable device, including a vertical height-adjustable rail and not fewer than two layers of vertical roller beds, each vertical roller bed may ascend or descend in a height direction of a vertical height-adjustable rail, the vertical roller bed is opposite to the plate receiving roller bed, and the plate glass is movable in a horizontal direction of the vertical roller bed; and a plate sending device, arranged at a head end of a deep processing line or a stacking machine roller bed. The three-dimensional conveying device and method for a plate glass production line can improve the utilization efficiency of workshop space, and improve the overall manufacturing efficiency.

19 Claims, 6 Drawing Sheets

(51) Int. Cl.
    *B65G 49/06*     (2006.01)
    *B65G 57/112*     (2006.01)
    *B65G 69/24*     (2006.01)

(56) References Cited

U.S. PATENT DOCUMENTS

| | | | |
|---|---|---|---|
| 7,155,938 B2 * | 1/2007 | Honegger | C03B 33/0207 |
| | | | 209/552 |
| 9,919,878 B2 * | 3/2018 | Dong | H05K 13/0061 |
| 10,597,237 B2 * | 3/2020 | Itoh | B65G 47/643 |
| 10,766,714 B2 * | 9/2020 | Itoh | B65G 47/52 |
| 2007/0020067 A1 * | 1/2007 | Lin | B65G 49/064 |
| | | | 414/811 |
| 2011/0081221 A1 * | 4/2011 | Balbi | B65G 49/062 |
| | | | 414/225.01 |

FOREIGN PATENT DOCUMENTS

| | | |
|---|---|---|
| CN | 106628814 A | 5/2017 |
| CN | 107720272 A | 2/2018 |
| CN | 208560948 U | 3/2019 |
| CN | 112340450 A | 2/2021 |
| EP | 0070805 A1 | 1/1983 |
| ES | 2224042 T3 | 3/2005 |

* cited by examiner

THREE-DIMENSIONAL CONVEYING DEVICE AND METHOD FOR PLATE GLASS PRODUCTION LINE

CROSS REFERENCE TO RELATED PATENT APPLICATION

The present application is the US national stage of PCT/CN2021/126587 filed on 2021 Oct. 27, which claims the priority of the Chinese patent applications No. 202011167905.X filed on 2020 Oct. 27, which application is incorporated herein by reference.

BACKGROUND OF THE PRESENT DISCLOSURE

Field of Disclosure

The present disclosure relates to the technical field of glass production, in particular, to a three-dimensional conveying device and method for a plate glass production line.

Description of Related Arts

Currently, in the overall layout of existing glass factories, the cold-end production line is generally on the second floor. However, plate glass in the production process needs to be conveyed to the deep processing line on the first floor for subsequent production, or needs to be transferred to the finished product warehouse on the first floor for storage after being stacked. For the above layout, three existing solutions are mainly provided. 1. A long slope roller bed is adopted to convey the glass to the first floor and directly to the deep processing line or stacking position. 2. The cold end production line and the deep processing line are built on the same floor to realize the direct connection of the cold end production line to the deep processing line. 3. The plate glass is stacked on the second floor, lifted to the first floor by a traveling crane, and then loaded on the deep processing line or transferred to the finished product warehouse. In the first two solutions, civil construction costs are very high and the space utilization of the production workshop is low. In the third solution, the process of lifting the plate glass from the second floor to the first floor and loading glass to the deep processing line is added, which leads to low production efficiency and easily causes glass breakage and additional loss.

SUMMARY

The present disclosure provides a three-dimensional conveying device and method for a plate glass production line, to solve the problem of vertically conveying glass in a continuous production process of the glass production line, thereby improving the utilization efficiency of workshop space.

The specific technical solutions are as follows.

The three-dimensional conveying device for the plate glass production line includes a plate receiving device, a vertical height-adjustable device, and a plate sending device. The plate receiving device is arranged at a tail end of an original plate production line. The plate receiving device comprises a plate receiving height-adjustable rail and not fewer than two layers of plate receiving roller beds, adjacent plate receiving roller beds are arranged parallel to each other, each of the plate receiving roller beds is configured to ascend or descend in a height direction of the plate receiving height-adjustable rail, and plate glass is movable in a driving direction of driving components in the plate receiving roller beds.

The vertical height-adjustable device comprises a vertical height-adjustable rail and not fewer than two layers of vertical roller beds. The vertical height-adjustable rail is arranged in a vertical direction, adjacent vertical roller beds are arranged parallel to each other, each of the vertical roller beds is configured to ascend or descend in a height direction of the vertical height-adjustable rail, the vertical roller bed is opposite to the plate receiving roller bed, and the plate glass is movable in a horizontal direction of the vertical roller bed.

The plate sending device is arranged at a head end of a deep processing line or a stacking machine roller bed. The plate sending device is arranged above or below the plate receiving device, the plate sending device comprises a plate sending height-adjustable rail and not fewer than two layers of plate sending roller beds, adjacent plate sending roller beds are arranged parallel to each other, each of the plate sending roller beds is configured to ascend or descend in a height direction of the plate sending height-adjustable rail, and the plate glass is movable in a driving direction of driving components in the plate sending roller beds.

In some embodiments, a quantity of layers of the vertical roller beds, and a quantity of layers of the plate sending roller beds are equal.

In some embodiments, the plate glass may be one or more of a monolithic glass plate, a halved glass plate, and a multi-segmented glass plate.

In some embodiments, the plate receiving device and the plate sending device are located on different floors, and the vertical height-adjustable device extends through the different floors.

In some embodiments, the plate receiving device and the plate sending device are located on the same side of the vertical height-adjustable device, or the plate receiving device and the plate sending device are located on opposite sides of the vertical height-adjustable device.

In some embodiments, a time required for filling all of the plate receiving roller beds in the plate receiving device with the plate glass is greater than a time required for the vertical height-adjustable device to convey the plate glass to the plate sending device and return to a side of the plate receiving device.

In some embodiments, the plate receiving roller bed, the vertical roller bed, and the plate sending roller bed may all be a belt or a roller.

In some embodiments, the plate receiving height-adjustable rail, the vertical height-adjustable rail, and the plate sending height-adjustable rail may each adopt one of chain transmission, gear transmission, and synchronous belt transmission.

In some embodiments, the plate receiving device is provided with a plate receiving roller bed zero-position switch configured to position a docked conveying zero position of the plate receiving roller bed relative to the vertical roller bed, the vertical height-adjustable device is provided with a first vertical roller bed zero-position switch and a second vertical roller bed zero-position switch respectively configured to position docked conveying zero positions of the vertical roller beds relative to the plate receiving roller bed and the plate sending roller bed, and the plate sending device is provided with a plate sending roller bed zero-position switch configured to position a docked conveying zero position of the plate sending roller bed relative to the vertical roller bed.

In some embodiments, the plate receiving device, the vertical height-adjustable device, and the plate sending device may all adopt an arrangement structure. The arrangement structure includes a fixing support, a height-adjustable rail assembly, and a roller bed assembly. The height-adjustable rail assembly and the roller bed assembly are both arranged on the fixing support, and the height-adjustable rail assembly drives the roller bed assembly to ascend or descend on the fixing support. The roller bed assembly comprises not fewer than two layers of roller beds. The height-adjustable rail assembly is used as the plate receiving height-adjustable rail, the vertical height-adjustable rail, or the plate sending height-adjustable rail, and the roller beds of the roller bed assembly are correspondingly used as the plate receiving roller beds, the vertical roller beds, or the plate sending roller beds.

In some embodiments, the height-adjustable rail assembly comprises a four-shaft linkage driving mechanism and a transmission mechanism connected to the four-shaft linkage driving mechanism. The roller bed assembly is connected to the transmission mechanism, and the transmission mechanism is driven by the four-shaft linkage driving mechanism to operate and drive the roller bed assembly to ascend or descend.

In some embodiments, the four-shaft linkage driving mechanism comprises a driving motor. A double-shaft speed reducer is connected to a rotary shaft of the driving motor, a T-type commutator is connected to each of two output shafts of the double-shaft speed reducer through a universal shaft, a transmission shaft is connected to each of two output ends of the T-type commutator, and one transmission mechanism is connected to each of the transmission shafts.

In some embodiments, the transmission mechanism comprises a driving wheel, a driven wheel, and a synchronous belt. The four-shaft linkage driving mechanism is connected to the driving wheel and drives the driving wheel to rotate, and the driven wheel is spaced apart from and opposite to the driving wheel in a height direction of the fixing support. Two ends of the synchronous belt are respectively sleeved on the driving wheel and the driven wheel, and the roller bed assembly is connected to the synchronous belt.

In some embodiments, the driving wheel and the driven wheel are both chain wheels, and the synchronous belt is a chain.

In some embodiments, the fixing support comprises a support plate and legs arranged below the support plate and supporting four corners of the support plate, the four-shaft linkage driving mechanism is arranged on the support plate, and the transmission mechanism is arranged on a side of each of the legs in a height direction of the legs.

In some embodiments, the roller bed assembly comprises a conveying support, each of the roller beds is a single-layer self-driven roller bed, all of the single-layer self-driven roller beds are arranged on the conveying support, the conveying support is arranged on the fixing support in a height-adjustable manner, and the height-adjustable rail assembly is connected to the conveying support and drives the conveying support to ascend or descend on the fixing support.

In some embodiments, a guide wheel is arranged on the conveying support, a guide chute extending in a height direction of the fixing support is arranged on the fixing support, and the conveying support is slidably mated with and connected to the guide chute through the guide wheel.

A three-dimensional conveying method for a plate glass production line, including the following steps: step I: moving plate glass produced by an original plate production line one piece by one piece to each layer of plate receiving roller bed of a plate receiving device, wherein a set of plate glass is placed on the each layer of plate receiving roller bed; step II: simultaneously transferring the plate glass on the each layer of plate receiving roller bed of the plate receiving device to a corresponding vertical roller bed of a vertical height-adjustable device, wherein the vertical height-adjustable device moves, to a floor where the plate sending device is located, the vertical roller bed from a floor where the plate receiving roller bed is located; step III: simultaneously transferring the plate glass on the each layer of vertical roller bed of the vertical height-adjustable device to the corresponding plate sending roller bed of the plate sending device; and step IV: moving the plate glass on the each layer of plate sending roller bed of the plate sending device one piece by one piece to a deep processing line or a stacking machine roller bed.

In some embodiments, in step II, before the plate glass is transferred, the plate receiving roller bed is positioned and stays at a docked conveying zero position of the plate receiving roller bed relative to the vertical roller bed according to a signal of a plate receiving roller bed zero-position switch, and the vertical roller bed is positioned and stays at a docked conveying zero position of the vertical roller bed relative to the plate receiving roller bed according to a signal of a first vertical roller bed zero-position switch.

In some embodiments, in step III, before the plate glass is transferred, the vertical roller bed is positioned and stays at a docked conveying zero position of the vertical roller bed relative to the plate sending roller bed according to a signal of a second vertical roller bed zero-position switch, and the plate sending roller bed is positioned and stays at a docked conveying zero position of the plate sending roller bed relative to the vertical roller bed according to a signal of a plate sending roller bed zero-position switch.

The beneficial effects of the foregoing technical solutions are as follows.

According to the three-dimensional conveying device and method for the plate glass production line provided in the present disclosure, by adding vertical height-adjustable devices among different floors, the plate glass can be movably conveyed across floors in a vertical direction, which reduces civil construction costs of an enterprise. In this way, the layout of the production line in each floor can be reasonably arranged, which improves the space utilization of the enterprise workshop. A series of processes such as glass stacking, transfer, and loading are reduced, which improves the production efficiency of the enterprise.

Figure 1:
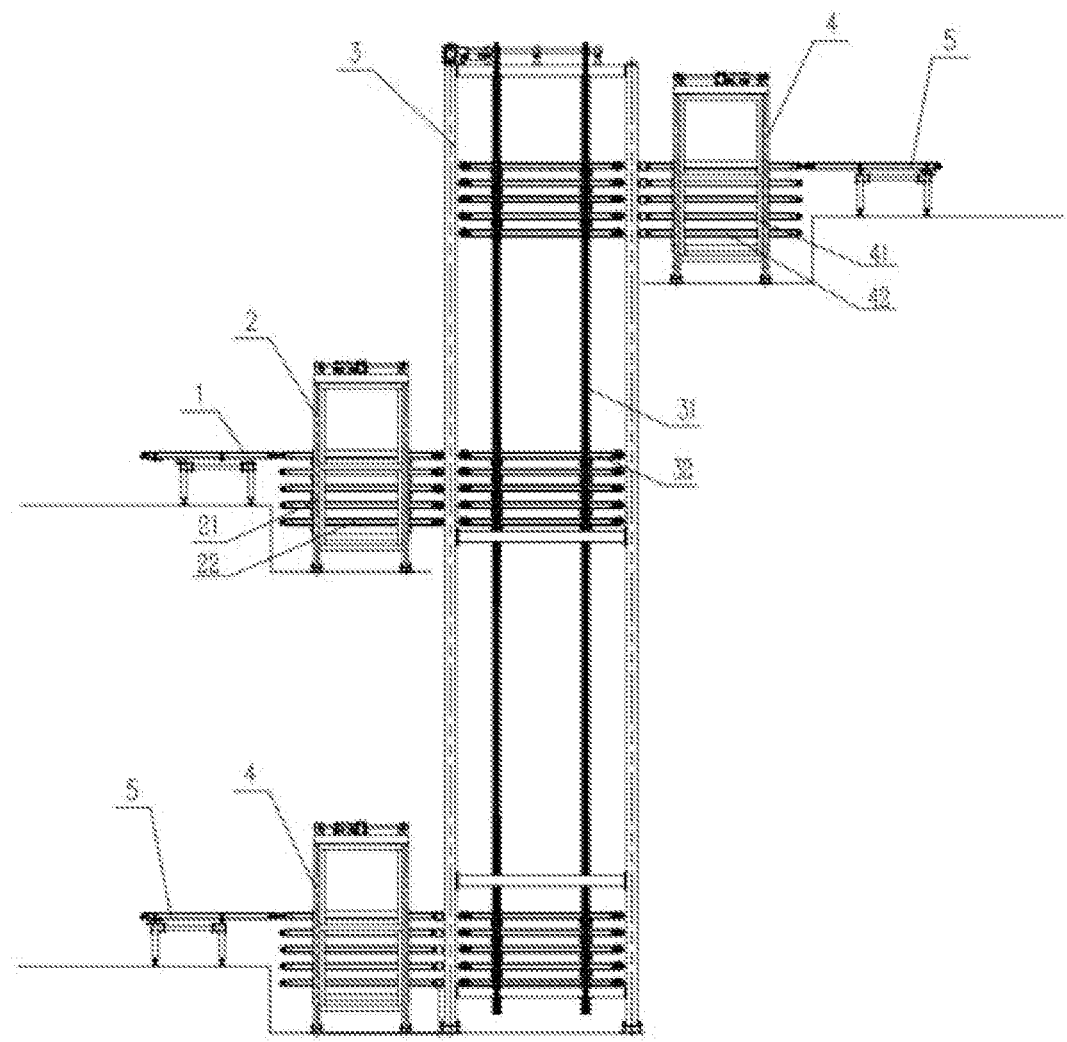
FIG. 1 is a schematic structural diagram of an embodiment of a three-dimensional conveying device for a plate glass production line according to the present disclosure.

In the accompanying drawings: 1. Original plate production line; 2. Plate receiving device; 21. Plate receiving height-adjustable rail; 22. Plate receiving roller bed; 23. Plate receiving roller bed zero-position switch; 3. Vertical height-adjustable device; 31. Vertical height-adjustable rail; 32. Vertical roller bed; 33. First vertical roller bed zero-position switch; 34. Second vertical roller bed zero-position switch; 4. Plate sending device; 41. Plate sending height-adjustable rail; 42. Plate sending roller bed; 43. Plate sending roller bed zero-position switch; 5. Deep processing line or stacking machine roller bed; 6. Fixing support; 61. Support plate; 62. Leg; 63. Zero-position photoelectric switch; 64. Guide chute; 7. Four-shaft linkage driving mechanism; 71. Driving motor; 72. Double-shaft speed reducer; 73. Universal shaft; 74. T-type commutator; 75. Transmission shaft; 8. Transmission mechanism; 81. Driving wheel; 82. Driven wheel; 83. Synchronous belt; 9. Roller bed assembly; 91. Conveying support; 92. Single-layer self-driven roller bed; 93. Guide wheel.

DETAILED DESCRIPTION

In order to make the technical means, creation features, purpose and efficacy realized by the present disclosure easy to understand, a three-dimensional conveying device for a plate glass production line provided in the present disclosure is described in detail with reference to FIGS. 1 to 6 in following embodiments.

The serial numbers for components in this specification, such as "first" and "second", are only used to distinguish the described objects, and do not have any order or technical meaning. The "connection" in the present disclosure, unless otherwise specified, include direct and indirect connection. In the description of the present disclosure, it should be understood that, orientation or position relationships indicated by terms such as "upper", "lower", "front", "rear", "left", "right", "vertical", "horizontal", "top", "bottom", "inner", "outer", "clockwise", and "counterclockwise" are orientation or position relationships shown based on the accompanying drawings, and are used for describing the present disclosure and simplifying the description, rather than indicating or implying that the mentioned apparatus or element should have a particular orientation or be constructed and operated in a particular orientation, and therefore, should not be construed as a limitation to the present disclosure.

In the present disclosure, unless otherwise explicitly specified and defined, a first feature is "on" or "below" a second feature may mean that the first feature and the second feature are in direct, or the first feature and the second feature are in indirect contact through an intermediate medium. In addition, that the first feature is "above", "over", or "on" the second feature may indicate that the first feature is directly above or obliquely above the second feature, or may merely indicate that the horizontal position of the first feature is higher than that of the second feature. The first feature "under", "below" and "down" the second feature may be that the first feature is directly below or obliquely below the second feature, or simply indicates that a horizontal height of the first feature is less than that of the second feature.

In the three-dimensional conveying device for the plate glass production line, a plate receiving device 2 temporarily stores and receives plate glass produced by an original plate production line 1. The plate receiving device 2 is arranged at a tail end of the original plate production line 1. The plate receiving device 2 includes a plate receiving height-adjustable rail 21 and not fewer than two layers of plate receiving roller beds 22. Adjacent plate receiving roller beds 22 are arranged parallel to each other, and a gap is provided between two adjacent plate receiving roller beds 22 for the plate glass to be inserted. Each of the plate receiving roller beds 22 can ascend and descend in a height direction of the plate receiving height-adjustable rail 21. That is to say, after one of the plate receiving roller beds 22 is filled with the plate glass, an adjacent previous or next plate receiving height-adjustable rail 21 moves to the same height as the original plate production line, and receives a next batch of plate glass. Then all of the plate receiving roller beds 22 are filled with the plate glass. The plate glass is movable along a moving direction of transmission components in the plate receiving roller beds 22. The moving direction is a horizontal direction and perpendicular to a vertical direction.

A vertical height-adjustable device 3 transfers the plate glass in the plate receiving device 2 to a plate sending device 4. The vertical height-adjustable device 3 includes a vertical height-adjustable rail 31 and not fewer than two layers of vertical roller beds 32. Specifically, a quantity of vertical roller beds 32 of the vertical height-adjustable device 3 is not less than a quantity of plate receiving roller beds 22 of the plate receiving device 2. The vertical roller beds 32 can be aligned to the plate receiving roller beds 22 in a one-to-one correspondence after being moved, so that the plate glass on each layer of plate receiving roller bed 22 can be transferred to the vertical roller bed 32 at a corresponding layer. A rolling component is arranged on each of the plate receiving roller beds 22 and the vertical roller beds 32 for movement of the plate glass in the horizontal direction. The vertical height-adjustable rail 31 is arranged in the vertical direction and docks with the plate receiving device 2 and the plate sending device 4 at different horizontal heights. Adjacent vertical roller beds 32 are arranged parallel to each other to facilitate carrying of the plate glass. Each of the vertical roller beds 32 can ascend and descend in a height direction of the vertical height-adjustable rail 31. The vertical roller beds 32 may be aligned to the plate receiving roller beds 22, and the plate glass is movable in a horizontal direction of the vertical roller bed 32, which facilitates the subsequent transfer of the plate glass to the plate sending device 4 by the vertical roller bed 32.

The plate sending device 4 is arranged at a head end of a deep processing line or a stacking machine roller bed 5. The plate sending device 4 is located above or below the plate receiving device 2. That is to say, the plate sending device 4 and the plate receiving device are located at different horizontal heights. The plate sending device 4 includes a plate sending height-adjustable rail 41 and not fewer than two layers of plate sending roller beds 42. Specifically, a quantity of vertical roller beds 32 is not less than that of the plate sending roller beds 42, and a quantity of plate receiving roller beds 22 is the same as a quantity of the plate sending roller beds 42. Adjacent plate sending roller beds 42 are arranged parallel to each other, and a gap is provided between two adjacent plate sending roller beds 42 for the plate glass to be inserted. Each of the plate sending roller beds 42 can ascend and descend in a height direction of the plate sending height-adjustable rail 41. That is to say, after the plate glass in one of the plate sending roller beds 42 is delivered, an adjacent previous or next plate sending roller bed 42 is moved to the same height as the deep processing line or the stacking machine roller bed 5, and transfers a next batch of plate glass to the deep processing line or the stacking machine roller bed 5. Then the plate glass in all of the plate sending roller beds 42 is conveyed to the deep processing line or the stacking machine roller bed 5. The plate glass is movable in a moving direction of transmission components in the plate sending roller beds 42. The moving direction is a horizontal direction and perpendicular to a vertical direction.

In a preferred implementation, as shown in FIG. 1, a quantity of layers of plate receiving roller beds 22, a quantity of layers of vertical roller beds 32, and a quantity of layers of plate sending roller beds 42 are equal. First, all of the plate receiving roller beds are in a one-to-one correspondence with all of the vertical roller beds 32, and the plate glass in the plate receiving roller beds 22 is simultaneously transferred to the vertical roller beds 32. Subsequently, all of the vertical roller beds 32 are in a one-to-one correspondence with all of the plate sending roller beds 42, and the plate glass in the vertical roller beds 32 is simultaneously transferred to the plate sending roller beds 42. Specifically, a spacing between adjacent plate receiving roller beds 22, a spacing between adjacent vertical roller beds 32, and a spacing between adjacent plate sending roller beds 42 are equal, so as to prevent a hinderance to the transfer of the plate glass.

In a preferred implementation, as shown in FIG. 1, the plate glass may be one or more of a monolithic glass plate, a halved glass plate, and a multi-segmented glass plate. The three-dimensional conveying device can transfer multiple types of the plate glass, such as a combination of the monolithic glass plate and the halved glass plate, a combination of the monolithic glass plate and the multi-segmented glass plate, a combination of the halved glass plate and the multi-segmented glass plate, and a combination of the monolithic glass plate, the halved glass plate, and the multi-segmented glass plate, as long as a stacking thickness of the glass combination is less than the spacing between the adjacent plate receiving roller beds 22, the spacing between the adjacent vertical roller beds 32, and the spacing between the adjacent plate sending roller beds 42.

In a preferred implementation, as shown in FIG. 1, the plate receiving device 2 and the plate sending device 4 are located on different floors. The plate receiving device 2 is generally located on a middle floor, the plate sending device 4 is located on a bottom floor and/or a top floor, and the vertical height-adjustable device 3 extends through different floors. Through the reciprocating movement of the vertical height-adjustable device 3 among different floors, the plate glass can be quickly transported across floors, while effectively improving the space utilization in the workshop.

In a preferred implementation, as shown in FIG. 1, the plate receiving device 2 and the plate sending device 4 are located on a same side of the vertical height-adjustable device 3, or the plate receiving device 2 and the plate sending device 4 are located on opposite sides of the vertical height-adjustable device 3. Specifically, a moving direction of the transmission component of the vertical roller bed 32 may be changed. When the plate receiving device 2 and the plate sending device 4 are located on opposite sides of the vertical height-adjustable device 3, the transmission component of the vertical roller bed 32 can always keep moving in a same direction. When the plate receiving device 2 and the plate sending device 4 are located on a same side of the vertical height-adjustable device 3, the moving direction of the transmission component of the vertical roller bed 32 when the plate glass is transferred from the plate receiving device 2 to the vertical height-adjustable device 3 is opposite to the moving direction of the driving component of the vertical roller bed 32 when the plate glass is transferred from the vertical height-adjustable device 3 to the plate sending device 4. This can be achieved by changing the driving direction of the driving component of the vertical roller bed 32, so as to satisfy the requirement for arrangement of multiple devices.

In a preferred implementation, as shown in FIG. 1, the plate receiving roller bed 22, the vertical roller bed 32, and the plate sending roller bed 42 may all be a belt-conveyor-type roller bed or a roller-conveyor-type roller bed, which may be selected according to an actual arrangement requirement.

Specifically, the belt-conveyor-type roller bed includes a conveying support, conveying wheels, a conveying belt, and a driving device. The conveying support is generally a rectangular frame. A direction of two long sides of the rectangular frame is set as a moving direction of the plate glass on the plate receiving roller bed. Two sets of conveying wheels are respectively arranged on inner sides of the two long sides of the rectangular frame. Circumferential sides of the conveying wheels on a same side are sleeved with a conveying belt, and the driving device is drive-connected to one or more conveying wheels to drive the movement of the conveying belt through the rotation of the conveying wheels. During transfer of the glass, a bottom of the plate glass is in contact with the conveying belts on two sides. Specifically, the conveying belt is made of a soft material to avoid scratching the plate glass. In addition, the transfer speed is relatively slow to avoid relative movement between the plate glass and the conveying belt.

Specifically, the roller-conveyor-type roller bed includes a conveying support, a conveying roller, and a driving device. The conveying support is generally a rectangular frame. A direction of two long sides of the rectangular frame is set as the moving direction of the plate glass on the plate receiving roller bed. Two ends of the conveying roller are respectively connected to the two long sides of the rectangular frame, and the driving device is drive-connected to the conveying roller. During transfer of the glass, the bottom of the plate glass is in contact with a circumferential side surface of the conveying roller. Specifically, a circumferential outer wall of the conveying roller is wrapped with a soft material to avoid scratching the plate glass. In addition, the transfer speed is relatively slow to avoid relative sliding between the plate glass and the conveying roller.

In a preferred implementation, as shown in FIG. 1, the plate receiving height-adjustable rail 21, the vertical height-adjustable rail 31, and the plate sending height-adjustable rail 41 can all adopt one of chain transmission, gear transmission, and synchronous belt transmission.

Specifically, the chain transmission is similar to the synchronous belt transmission, and a transmission chain or a transmission belt is arranged on an inner side of the fixing support. A driving device is arranged on two ends of the transmission chain and the transmission belt. The transmission chain or the transmission belt can rotate clockwise or counterclockwise through rotation of the driving device. The plate receiving roller bed, the vertical roller bed, or the plate sending roller bed is fixedly connected to the transmission chain or the transmission belt, so that the plate receiving roller bed, the vertical roller bed, or the plate sending roller bed can ascend or descend in the vertical direction.

Specifically, the gear transmission mainly means a gear toothed belt transmission form. The gear is matched with the toothed belt, and the driving mechanism drives the gear to rotate, the rotation of the gear drives the toothed belt to move up and down. The plate receiving roller bed, the vertical roller bed, or the plate sending roller bed is fixedly connected to the toothed belt, so that the plate receiving roller bed, the vertical roller bed, or the plate sending roller bed can ascend or descend in the vertical direction.

In a preferred implementation, as shown in FIG. 1, in a case that a time required for filling all of the plate receiving roller beds 22 with the plate glass in the plate receiving device 2 is greater than a time required for the vertical height-adjustable device 3 to convey the plate glass to the plate sending device 4 and return to a side of the plate receiving device 2. That is to say, a quantity of layers of plate receiving roller beds 22 may be increased to extend the plate receiving duration, so as to ensure that the plate receiving device 2, the vertical height-adjustable device 3, and the plate sending device 4 can operate fully automatically without manual adjustment and intervention.

Figure 2:
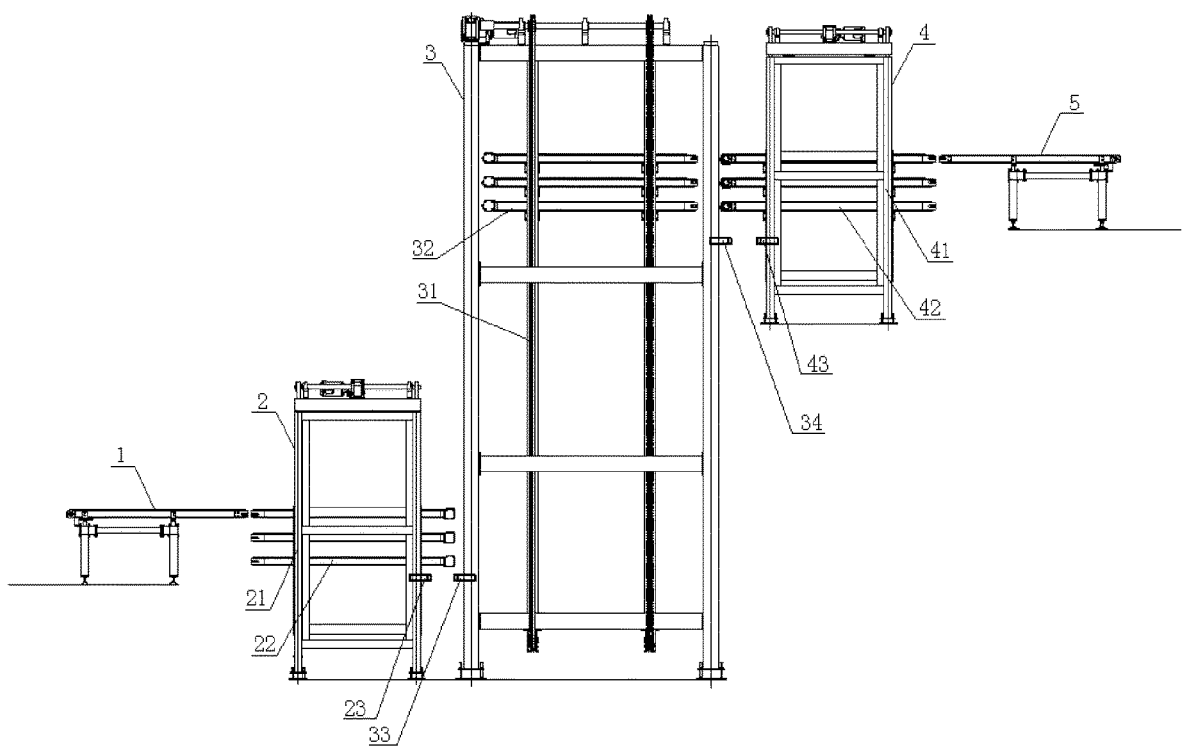
FIG. 2 is a simplified schematic diagram of a three-dimensional conveying device for a plate glass production line provided with a zero-position switch being arranged according to an embodiment of the present disclosure.

In a preferred implementation, as shown in FIG. 2, the plate receiving device 2 is provided with a plate receiving roller bed zero-position switch 23. The plate receiving roller bed zero-position switch 23 determines a docked conveying zero position of the plate receiving roller bed 22 relative to the vertical roller bed 32. The vertical height-adjustable device 3 is provided with a first vertical roller bed zero-position switch 33 and a second vertical roller bed zero-position switch 34. The first vertical roller bed zero-position switch 33 determines a docked conveying zero position of the vertical roller bed 32 relative to the plate receiving roller bed 22. The second vertical roller bed zero-position switch 34 determines a docked conveying zero position of the vertical roller bed 32 relative to the plate sending roller bed 42. The plate sending device 4 is provided with a plate sending roller bed zero-position switch 43. The plate sending roller bed zero-position switch 43 determines a docked conveying zero position of the plate sending roller bed 42 relative to the vertical roller bed 32. When the plate glass on the plate receiving roller bed 22 of the plate receiving device 2 needs to be transferred to the vertical roller bed 32 of the vertical height-adjustable device 3, the plate receiving roller bed 22 may be positioned and stays at the docked conveying zero position of the plate receiving roller bed 22 relative to the vertical roller bed 32 according to a signal of the plate receiving roller bed zero-position switch 23, and the vertical roller bed 32 may be positioned and stays at the docked conveying zero position of the vertical roller bed 32 relative to the plate receiving roller bed 22 according to a signal of the first vertical roller bed zero-position switch 33. In this case, the vertical roller beds 32 are aligned to the plate receiving roller beds 22 in a one-to-one correspondence, so that the plate glass on each layer of plate receiving roller bed 22 can be transferred to the vertical roller bed 32 at a corresponding layer. When the plate glass on the vertical roller bed 32 of the vertical height-adjustable device 3 needs to be transferred to the plate sending roller bed 42 of the plate sending device 4, the vertical roller bed 32 may be positioned and stays at the docked conveying zero position of the vertical roller bed 32 relative to the plate sending roller bed 42 according to a signal of the second vertical roller bed zero-position switch 34, and the plate sending roller bed 42 may be positioned and stays at the docked conveying zero position of the plate sending roller bed 42 relative to the vertical roller bed 32 according to a signal of the plate sending roller bed zero-position switch 43. In this case, the vertical roller beds 32 are aligned to the plate sending roller beds 42 in a one-to-one correspondence, so that the plate glass on each layer of vertical roller bed 32 can be transferred to the plate sending roller bed 42 at a corresponding layer. Preferably, the plate receiving roller bed zero-position switch 23, the first vertical roller bed zero-position switch 33, the second vertical roller bed zero-position switch 34, and the plate sending roller bed zero-position switch 43 may all adopt zero-position photoelectric switches.

Figure 3:
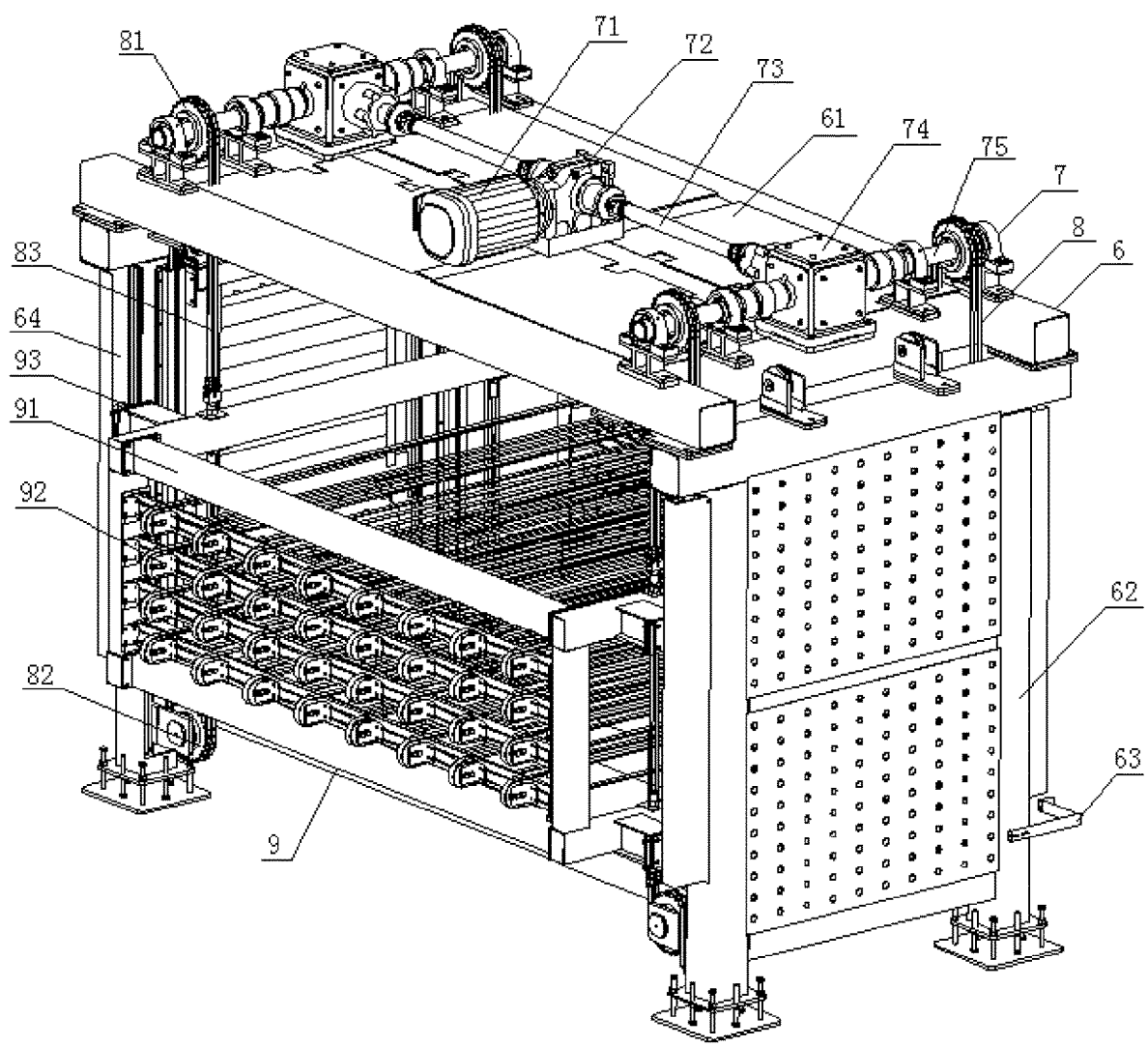
FIG. 3 is a schematic diagram of an arrangement structure that may be adopted by each of a plate receiving device, a vertical height-adjustable device, and a plate sending device in a three-dimensional conveying device for a plate glass production line according to an embodiment of the present disclosure.

In a preferred implementation, as shown in FIG. 3, the plate receiving device 2, the vertical height-adjustable device 3, and the plate sending device 4 may all adopt an arrangement structure. The arrangement structure includes a fixing support 6, a height-adjustable rail assembly, and a roller bed assembly 9. The height-adjustable rail assembly and the roller bed assembly 9 are both arranged on the fixing support 6. The height-adjustable rail assembly drives the roller bed assembly 9 to ascend or descend on the fixing support 6. The roller bed assembly 9 includes not fewer than two layers of roller beds. The height-adjustable rail assembly is used as the plate receiving height-adjustable rail 21, the vertical height-adjustable rail 31, or the plate sending height-adjustable rail 41. Correspondingly, the roller beds of the roller bed assembly 9 are used as the plate receiving roller beds 22, the vertical roller beds 32, or the plate sending roller beds 42, so as to form the plate receiving device 2, the vertical height-adjustable device 3, or the plate sending device 4. Since the plate receiving device 2 and the plate sending device 4 are located on different floors, and the vertical height-adjustable device 3 extends through different floors, an overall height of the vertical height-adjustable rail 31 of the vertical height-adjustable device 3 is greater than overall heights of the plate receiving height-adjustable rail 21 of the plate receiving device 2 and the plate sending height-adjustable rail 41 of the plate sending device 4. In this way, when the above arrangement structure is used to respectively form the plate receiving device 2, the vertical height-adjustable device 3, and the plate sending device 4, a height of the height-adjustable rail assembly which is used as the plate receiving height-adjustable rail 21, the vertical height-adjustable rail 31, and the plate sending height-adjustable rail 41 may be designed differently according to an actual requirement, to satisfy the requirement for quick carrying of the plate glass across floors.

Specifically, as shown in FIG. 3, the height-adjustable rail assembly may include a four-shaft linkage driving mechanism 7 and a transmission mechanism 8. The transmission mechanism 8 is connected to the four-shaft linkage driving mechanism 7, and the roller bed assembly 9 is connected to the transmission mechanism 8. The transmission mechanism 8 is driven by the four-shaft linkage driving mechanism 7 to operate and drive the roller bed assembly 9 to ascend or descend, so that the height-adjustable rail assembly drives the roller bed assembly 9 to ascend or descend on the fixing support 6.

Figure 4:
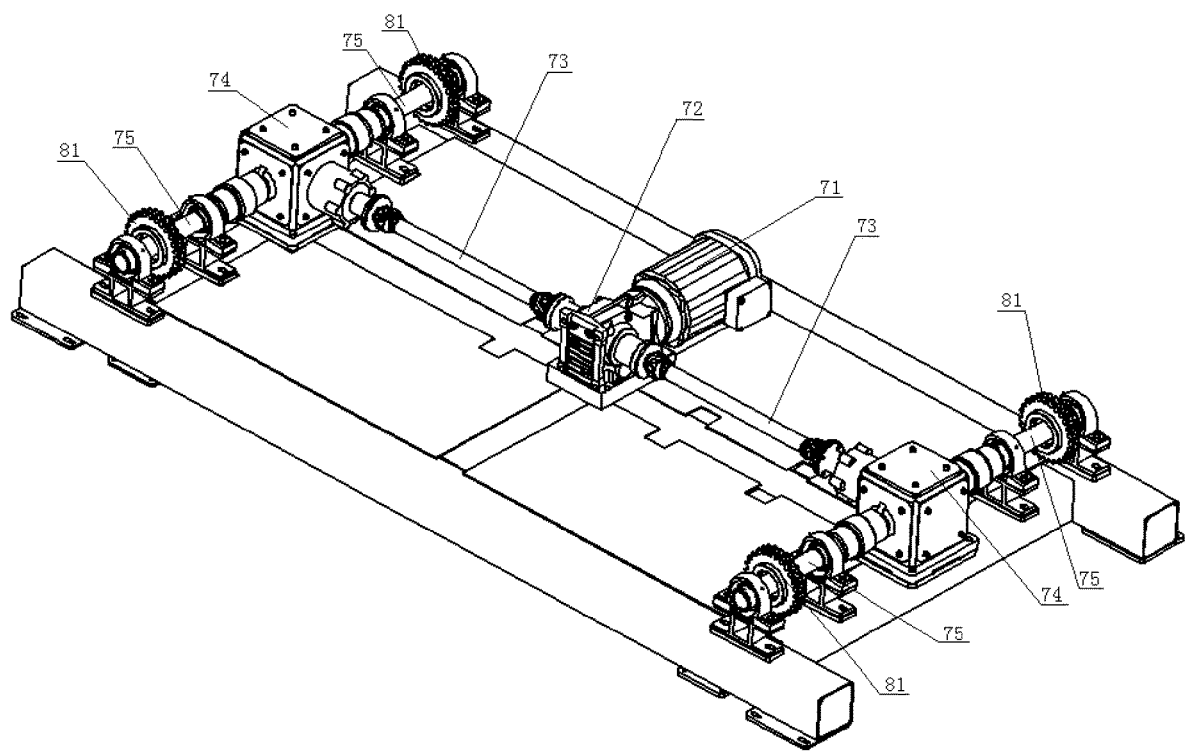
FIG. 4 is a schematic structural diagram of a four-shaft linkage driving mechanism in the arrangement structure shown in FIG. 3.

Preferably, as shown in FIG. 3 and FIG. 4, the four-shaft linkage driving mechanism 7 may include a driving motor 71, a double-shaft speed reducer 72, a universal shaft 73, a T-type commutator 74, and a transmission shaft 75. A rotary shaft of the driving motor 71 is connected to the double-shaft speed reducer 72, a T-type commutator 74 is connected to each of two output shafts of the double-shaft speed reducer 72 through the universal shaft 73. A transmission shaft 75 is connected to each of two output ends of each of the T-type commutators 74. A transmission mechanism 8 is connected to each transmission shaft 75. An axial direction of the rotary shaft of the driving motor 71 is parallel to a moving direction of the plate glass on the roller bed assembly 9. The two output shafts of the double-shaft speed reducer 72 and the universal shaft 73 connected to the two output shafts of the double-shaft speed reducer 72 are both perpendicular to the rotary shaft of the driving motor 71, and the two universal shafts 73 are respectively located on two sides of the rotary shaft of the driving motor 71. Four transmission shafts 75 connected to the two output ends of the two T-type commutators 74 are all parallel to the rotary shaft of the driving motor 71. In this way, the four transmission mechanisms 8 respectively connected to the four transmission shafts 75 are connected to the roller bed assembly 9 on two sides of the roller bed assembly 9 without interfering with the movement of the plate glass on the roller bed assembly 9. The driving motor 71 respectively transfers power to the two output shafts of the double-shaft speed reducer 72 through the double-shaft speed reducer 72, and the two output shafts of the double-shaft speed reducer 72 respectively transfer the power to the two output ends of the two T-type commutators 74 through the universal shaft 73. The two output ends of the two T-type commutators 74 respectively transfer the power to the transmission mechanism 8 through the transmission shaft 75, and simultaneously drive the four transmission mechanisms 8 to ascend or descend synchronously, thereby driving the roller bed assembly 9 to ascend or descend vertically. When the rotary shaft of the driving motor 71 rotates clockwise, the roller bed assembly 9 is driven to ascend vertically. When the rotary shaft of the driving motor 71 rotates counterclockwise, the roller bed assembly 9 is driven to descend vertically.

Figure 5:
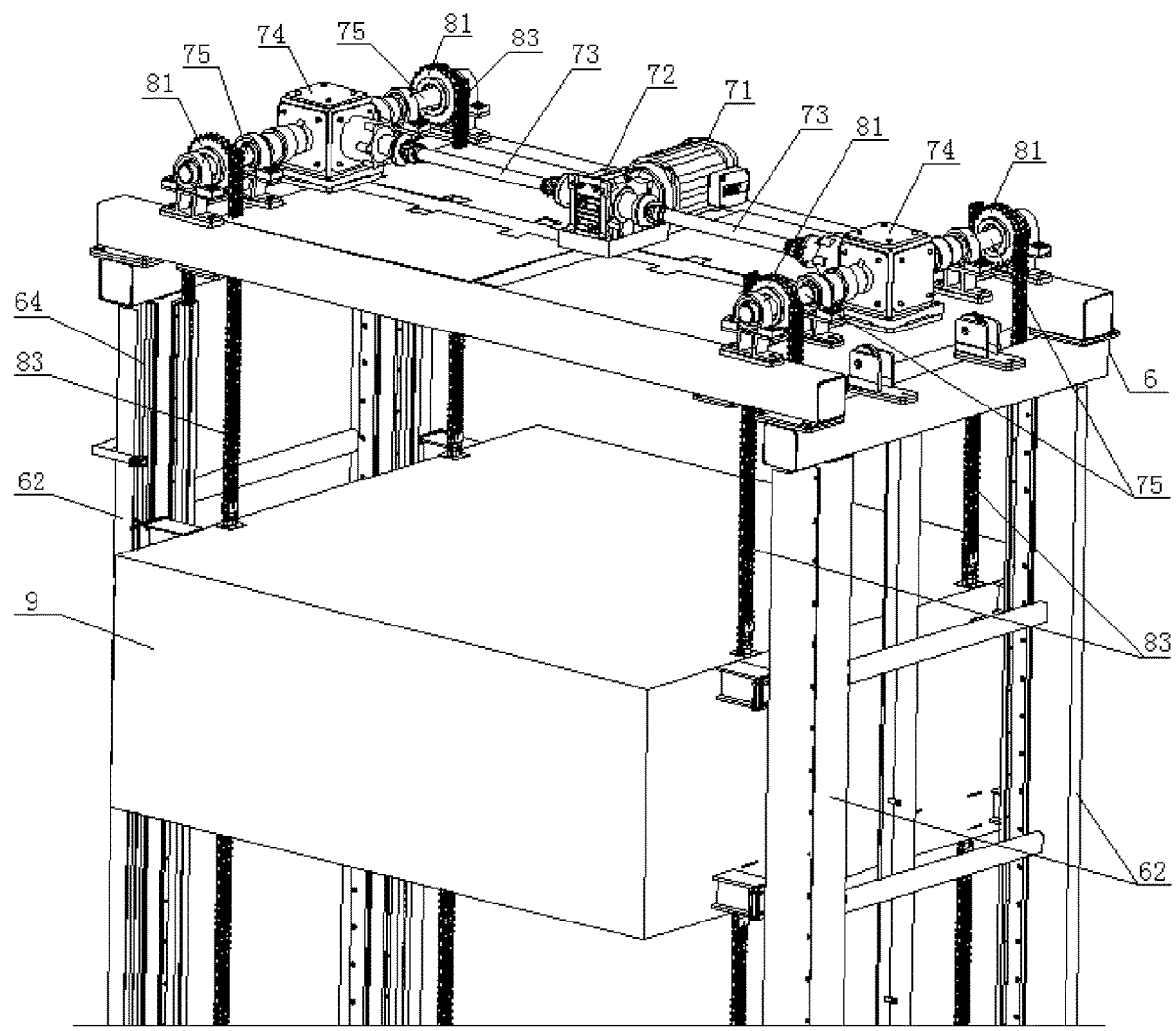
FIG. 5 is a partial schematic structural diagram of the arrangement structure shown in FIG. 3.

Preferably, as shown in FIGS. 3 and 5, the transmission mechanism 8 may include a driving wheel 81, a driven wheel 82, and a synchronous belt 83. The four-shaft linkage driving mechanism 7 is connected to the driving wheel 81 and drives the driving wheel 81 to rotate. The driving wheel 81 is mounted to the transmission shaft 75 in the four-shaft linkage driving mechanism 7. The driven wheel 82 is spaced apart from and opposite to the driving wheel 81 in a height direction of the fixing support 6. Two ends of the synchronous belt 83 are respectively sleeved on the driving wheel 81 and the driven wheel 82. The synchronous belt 83 is engaged with both the driving wheel 81 and the driven wheel 82, and the roller bed assembly 9 is connected to the synchronous belt 83. When the four-shaft linkage driving mechanism 7 drives the driving wheel 81 to rotate, the driving wheel 81 rotates to drive the synchronous belt 83 to operate around the driving wheel 81, the synchronous belt 83 drives the driven wheel 82 to synchronously rotate, and the synchronous belt 83 operates to drive the roller bed assembly 9 to synchronously ascend or descend accordingly. By changing the direction of rotation of the driving wheel 81, an operating direction of the synchronous belt 83 may be changed, so that the roller bed assembly 9 ascends or descends. Preferably, the driving wheel 81 and the driven wheel 82 may be both chain wheels, and the synchronous belt 83 may be a chain.

Preferably, as shown in FIG. 3, the fixing support 6 may include a support plate 61 and legs 62 arranged below the support plate 61 and supporting four corners of the support plate 61. The four-shaft linkage driving mechanism 7 is arranged on the support plate 61, and the transmission mechanism 8 is arranged on a side of each of the legs 62 in a height direction of the leg 62. The four transmission mechanisms 8 may be arranged at positions adjacent to the four legs 62, and the four transmission mechanisms 8 and the roller bed assembly 9 are all located in a frame formed by the four legs 62.

Preferably, as shown in FIG. 3, the fixing support 6 may be provided with a zero-position photoelectric switch 63. The zero-position photoelectric switch 63 is mounted to the legs 62 of the fixing support 6. When the arrangement structure shown in FIG. 3 is used to form the plate receiving device 2, one zero-position photoelectric switch 63 is arranged on the fixing support 6, and is used as the plate receiving roller bed zero-position switch 23. When the arrangement structure shown in FIG. 3 is used to form the vertical height-adjustable device 3, two zero-position photoelectric switches 63 are arranged on the fixing support 6, and are respectively used as the first vertical roller bed zero-position switch 33 and the second vertical roller bed zero-position switch 34. When the arrangement structure shown in FIG. 3 is used to form the plate sending device 4, one zero-position photoelectric switch 63 is arranged on the fixing support 6, and is used as the plate sending roller bed zero-position switch 43.

Figure 6:
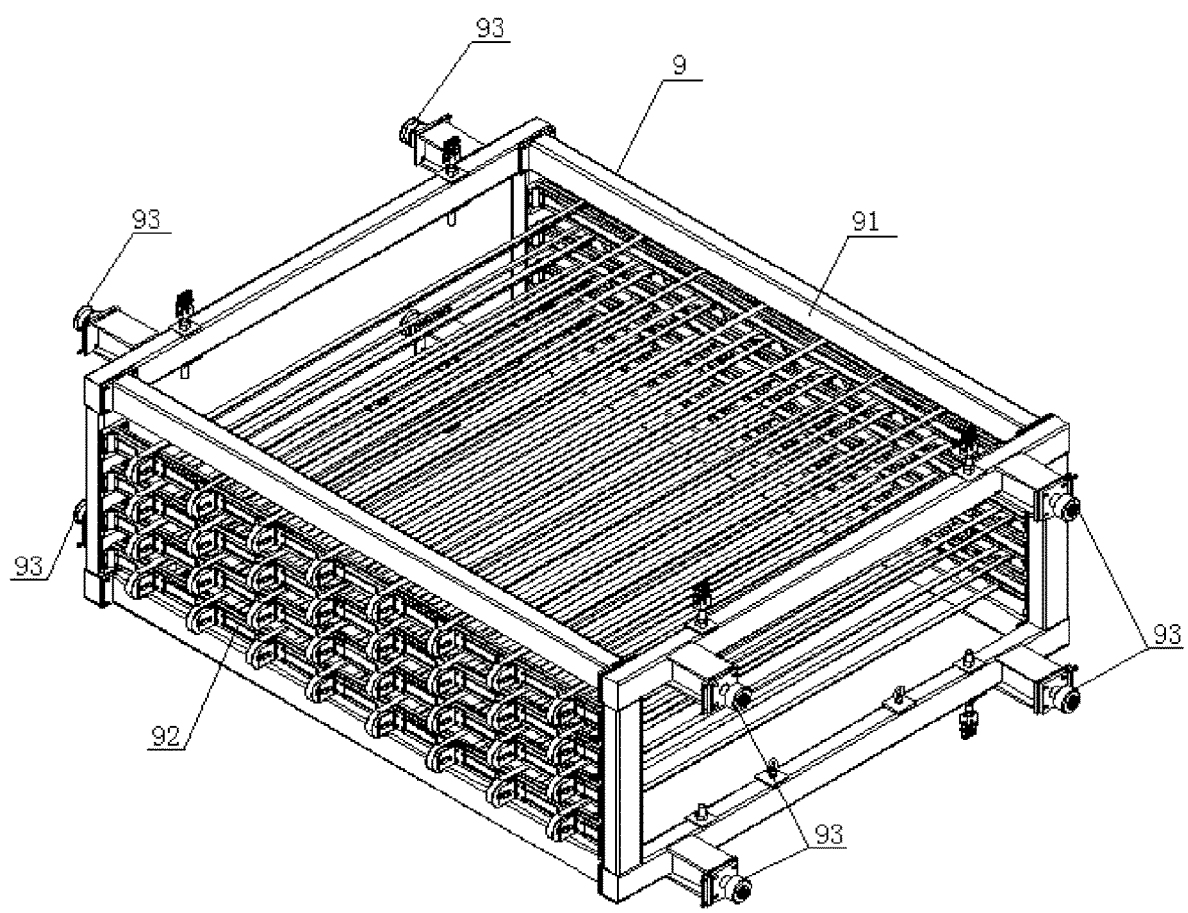
FIG. 6 is a schematic structural diagram of a roller bed assembly in the arrangement structure shown in FIG. 3.

Specifically, as shown in FIG. 3 and FIG. 6, the roller bed assembly 9 may include a conveying support 91. The roller beds of the roller bed assembly 9 are single-layer self-driven roller beds 92, and all of the single-layer self-driven roller beds 92 are arranged on the conveying support 91. Each layer of single-layer self-driven roller bed 92 can independently carry and convey the plate glass transversely, and the single-layer self-driven roller bed 92 may be a belt-conveyor-type roller bed or a roller-conveyor-type roller bed. The conveying support 91 is arranged on the fixing support 6 in a height-adjustable manner, and the height-adjustable rail assembly is connected to the conveying support 91 and drives the conveying support 91 to ascend or descend on the fixing support 6. The conveying support 91 drives overall ascending and descending of a plurality of layers of single-layer self-driven roller beds 92 that carries the plate glass. The conveying support 91 can ensure structural stability of the roller bed assembly 9, and ensure that all of the single-layer self-driven roller beds 92 carrying the plate glass ascend or descend synchronously and stably. The conveying support 91 may be fixedly connected to the synchronous belt 83 of the transmission mechanism 8 of the height-adjustable rail assembly.

Preferably, as shown in FIG. 3 and FIG. 6, a guide wheel 93 may be arranged on the conveying support 91, and a guide chute 64 extending in the height direction of the fixing support 6 is arranged on the fixing support 6. The conveying support 91 is slidably mated with and connected to the guide chute 64 on the fixing support 6 through the guide wheel 93. Therefore, the conveying support 91 is arranged on the fixing support 6 in a height-adjustable manner, and the guide chute 64 guide the ascending and descending of the conveying support 91 on the fixing support 6, thereby ensuring the smoothness and reliability of the roller bed assembly 9 during the ascending and descending. Four pairs of guide wheels 93 may be arranged on the conveying support 91. Each pair of guide wheels 93 include two guide wheels 93 arranged at intervals in the height direction of the fixing support 6. The guide chute 64 is arranged on each of four legs 62 of the fixing support 6. The four pairs of guide wheels 93 are respectively slidably mated with and connected to the guide chute 64 on the four legs 62.

The present disclosure further provides a three-dimensional conveying method for a plate glass production line. The method includes the following steps.

Step I: Move plate glass produced by an original plate production line to each layer of plate receiving roller bed 22 of a plate receiving device 2 one piece by one piece, to raise or lower the each layer of plate receiving roller bed 22 one by one in a stepping manner, and specifically, start driving devices of all layers of plate receiving roller beds 22 successively, wherein the driving device of the layer of plate receiving roller bed 22 after receiving the plate glass is no longer started, the driving device of the each layer of plate receiving roller bed 22 participates in the handling of the plate glass, and a set of plate glass is received on the plate receiving roller beds 22.

Step II: Simultaneously transfer the plate glass on the each layer of plate receiving roller bed 22 of the plate receiving device 2 to the corresponding vertical roller bed 32 of the vertical height-adjustable device 3, that is to say, simultaneously start the driving device on the each layer of plate receiving roller bed 22 and the driving device on each layer of vertical roller bed 32 to synchronously complete the movement of a plurality of sets of plate glass, so as to effectively enhance the carrying efficiency of the plate glass. Then the vertical height-adjustable device 3 moves the vertical roller bed 32 from a floor where the plate receiving roller bed 22 is located to a floor where the plate sending device 4 is located, and the vertical height-adjustable device 3 transfers and carries all plate glass on the vertical roller bed 32 between the floors. Preferably, before the plate glass is transferred, that is to say, before the plate glass on each layer of plate receiving roller bed of the plate receiving device 2 is simultaneously transferred to the corresponding vertical roller bed 32 of the vertical height-adjustable device 3, the plate receiving roller bed 22 is positioned and stays at a docked conveying zero position of the plate receiving roller bed 22 relative to the vertical roller bed 32 according to a signal of a plate receiving roller bed zero-position switch 23, and the vertical roller bed 32 is positioned and stays at a docked conveying zero position of the vertical roller bed 32 relative to the plate receiving roller bed 22 according to a signal of a first vertical roller bed zero-position switch 33. In this way, the vertical roller beds 32 are aligned to the plate receiving roller beds 22 in a one-to-one correspondence, so that the plate glass on each layer of plate receiving roller bed 22 can be transferred to the vertical roller bed 32 at a corresponding layer.

Step III: Simultaneously transfer the plate glass on each layer of vertical roller bed 32 of the vertical height-adjustable device 3 to the corresponding plate sending roller bed 42 of the plate sending device 4, that is to say, simultaneously start a driving device on each layer of vertical roller bed 32 and a driving device on each layer of plate sending roller bed 42 to complete synchronous movement of a plurality of sets of plate glass, so as to effectively enhance the carrying efficiency of the plate glass. Preferably, before the plate glass is transferred, that is to say, before the plate glass on each layer of vertical roller bed 32 of the vertical height-adjustable device 3 is simultaneously transferred to the corresponding plate sending roller bed 42 of the plate sending device 4, the vertical roller bed 32 is positioned and stays at a docked conveying zero position of the vertical roller bed 32 relative to the plate sending roller bed 42 according to a signal of a second vertical roller bed zero-position switch 34, and the plate sending roller bed 42 is positioned and stays at a docked conveying zero position of the plate sending roller bed 42 relative to the vertical roller bed 32 according to a signal of a plate sending roller bed zero-position switch 43. In this case, the vertical roller beds 32 are aligned to the plate sending roller beds 42 in a one-to-one correspondence, so that the plate glass on each layer of vertical roller bed 32 can be transferred to the plate sending roller bed 42 at a corresponding layer.

Step IV: Move the plate glass on each layer of plate sending roller bed 42 of the plate sending device 4 to a deep processing line or a stacking machine roller bed 5 one piece by one piece, and specifically, start driving devices of all layers of plate sending roller beds 42 successively, wherein when the layer of plate sending roller bed and the deep processing line or the stacking machine roller bed 5 are adjusted to the same horizontal height, the driving device of the layer of plate sending roller bed 42 is started to transfer the plate glass on the layer of plate sending roller bed to the deep processing line or the stacking machine roller bed 5, and the driving device on the layer of plate sending roller bed is turned off upon completion.

The technical features in the foregoing embodiments may be randomly combined. For concise description, not all possible combinations of the technical features in the embodiment are described. However, provided that combinations of the technical features do not conflict with each other, the combinations of the technical features are considered as falling within the scope recorded in this specification.

The above is only a preferred embodiment of the disclosure, and does not limit the implementation and protection scope of the disclosure. For those skilled in the art, it should be understood that all the solutions obtained from the equivalent replacement and obvious changes made by using the description and illustrated content of the disclosure should be included in the protection scope of the disclosure.

What is claimed is:

1. A three-dimensional conveying device for a plate glass production line, comprising:

a plate receiving device, arranged at a tail end of an original plate production line, wherein the plate receiving device comprises a plate receiving height-adjustable rail and not fewer than two layers of plate receiving roller beds, wherein adjacent plate receiving roller beds are arranged parallel to each other, each of the plate receiving roller beds is configured to ascend or descend in a height direction of the plate receiving height-adjustable rail, and plate glass is movable in a driving direction of driving components in the plate receiving roller beds;

a vertical height-adjustable device, comprising a vertical height-adjustable rail and not fewer than two layers of vertical roller beds, wherein the vertical height-adjustable rail is arranged in a vertical direction, adjacent vertical roller beds are arranged parallel to each other, each of the vertical roller beds is configured to ascend or descend in a height direction of the vertical height-adjustable rail, the vertical roller bed is opposite to the plate receiving roller bed, and the plate glass is movable in a horizontal direction of the vertical roller bed; and a plate sending device, arranged at a head end of a deep processing line or a stacking machine roller bed, wherein the plate sending device is arranged above or below the plate receiving device, and the plate sending device comprises a plate sending height-adjustable rail and not fewer than two layers of plate sending roller beds, wherein adjacent plate sending roller beds are arranged parallel to each other, each of the plate sending roller beds is configured to ascend or descend in a height direction of the plate sending height-adjustable rail, and the plate glass is movable in a driving direction of driving components in the plate sending roller beds;

wherein the plate receiving device is provided with a plate receiving roller bed zero-position switch configured to position a docked conveying zero position of the plate receiving roller bed relative to the vertical roller bed, the vertical height-adjustable device is provided with a first vertical roller bed zero-position switch and a second vertical roller bed zero-position switch respectively configured to position docked conveying zero positions of the vertical roller beds relative to the plate receiving roller bed and the plate sending roller bed, and the plate sending device is provided with a plate sending roller bed zero-position switch configured to position a docked conveying zero position of the plate sending roller bed relative to the vertical roller bed.

2. The three-dimensional conveying device for the plate glass production line as in claim 1, wherein a quantity of layers of the plate receiving roller beds, a quantity of layers of the vertical roller beds, and a quantity of layers of the plate sending roller beds are equal.

3. The three-dimensional conveying device for the plate glass production line as in claim 1, wherein the plate glass includes one or more of a monolithic glass plate, a halved glass plate, and a multi-segmented glass plate.

4. The three-dimensional conveying device for the plate glass production line as in claim 1, wherein the plate receiving device and the plate sending device are located on different floors, and the vertical height-adjustable device extends through the different floors.

5. The three-dimensional conveying device for the plate glass production line as in claim 4, wherein the plate receiving device and the plate sending device are located on the same side of the vertical height-adjustable device, or the plate receiving device and the plate sending device are located on opposite sides of the vertical height-adjustable device.

6. The three-dimensional conveying device for the plate glass production line as in claim 1, wherein a time required for filling all of the plate receiving roller beds in the plate receiving device with the plate glass is greater than a time required for the vertical height-adjustable device to convey the plate glass to the plate sending device and return to a side of the plate receiving device.

7. The three-dimensional conveying device for the plate glass production line as in claim 1, wherein the plate receiving roller bed, the vertical roller bed, and the plate sending roller bed each are a belt-conveyor-type roller bed or a roller-conveyor-type roller bed.

8. The three-dimensional conveying device for the plate glass production line as in claim 1, wherein the plate receiving height-adjustable rail, the vertical height-adjustable rail, and the plate sending height-adjustable rail each adopt one of chain transmission, gear transmission, and synchronous belt transmission.

9. The three-dimensional conveying device for the plate glass production line as in claim 1, wherein the plate receiving device, the vertical height-adjustable device, and the plate sending device each adopt an arrangement structure, wherein the arrangement structure comprises a fixing support, a height-adjustable rail assembly, and a roller bed assembly, wherein the height-adjustable rail assembly and the roller bed assembly are both arranged on the fixing support, the height-adjustable rail assembly drives the roller bed assembly to ascend or descend on the fixing support, and the roller bed assembly comprises not fewer than two layers of roller beds; the height-adjustable rail assembly is used as the plate receiving height-adjustable rail, the vertical height-adjustable rail, or the plate sending height-adjustable rail, and the roller beds of the roller bed assembly are correspondingly used as the plate receiving roller beds, the vertical roller beds, or the plate sending roller beds.

10. The three-dimensional conveying device for the plate glass production line as in claim 9, wherein the height-adjustable rail assembly comprises a four-shaft linkage driving mechanism and a transmission mechanism connected to the four-shaft linkage driving mechanism, the roller bed assembly is connected to the transmission mechanism, and the transmission mechanism is driven by the four-shaft linkage driving mechanism to operate and drive the roller bed assembly to ascend or descend.

11. The three-dimensional conveying device for the plate glass production line as in claim 10, wherein the four-shaft linkage driving mechanism comprises a driving motor, a double-shaft speed reducer is connected to a rotary shaft of the driving motor, a T-type commutator is connected to each of two output shafts of the double-shaft speed reducer through a universal shaft, a transmission shaft is connected to each of two output ends of the T-type commutator, and one said transmission mechanism is connected to each of the transmission shafts.

12. The three-dimensional conveying device for the plate glass production line as in claim 10, wherein the transmission mechanism comprises a driving wheel, a driven wheel, and a synchronous belt, wherein the four-shaft linkage driving mechanism is connected to the driving wheel and drives the driving wheel to rotate, the driven wheel is spaced apart from and opposite to the driving wheel in a height direction of the fixing support, two ends of the synchronous belt are respectively sleeved on the driving wheel and the driven wheel, and the roller bed assembly is connected to the synchronous belt.

13. The three-dimensional conveying device for the plate glass production line as in claim 12, wherein the driving wheel and the driven wheel are both chain wheels, and the synchronous belt is a chain.

14. The three-dimensional conveying device for the plate glass production line as in claim 10, wherein the fixing support comprises a support plate and legs arranged below the support plate and supporting four corners of the support plate, the four-shaft linkage driving mechanism is arranged on the support plate, and the transmission mechanism is arranged on a side of each of the legs in a height direction of the legs.

15. The three-dimensional conveying device for the plate glass production line as in claim 9, wherein the roller bed assembly comprises a conveying support, each of the roller beds is a single-layer self-driven roller bed, all of the single-layer self-driven roller beds are arranged on the conveying support, the conveying support is arranged on the fixing support in a height-adjustable manner, and the height-adjustable rail assembly is connected to the conveying support and drives the conveying support to ascend or descend on the fixing support.

16. The three-dimensional conveying device for the plate glass production line as in claim 15, wherein a guide wheel is arranged on the conveying support, a guide chute extending in a height direction of the fixing support is arranged on the fixing support, and the conveying support is slidably mated with and connected to the guide chute through the guide wheel.

17. A three-dimensional conveying method for a plate glass production line, comprising the conveying device according to claim 1, wherein the method comprises:
   step I: moving plate glass produced by an original plate production line one piece by one piece to each layer of plate receiving roller bed of a plate receiving device, wherein a set of plate glass is placed on the each layer of plate receiving roller bed;
   step II: simultaneously transferring the plate glass on the each layer of plate receiving roller bed of the plate receiving device to a corresponding vertical roller bed of a vertical height-adjustable device, and the vertical height-adjustable device moves the vertical roller bed from a floor where the plate receiving roller bed is located to a floor where the plate sending device is located;

step III: simultaneously transferring the plate glass on the each layer of vertical roller bed of the vertical height-adjustable device to the corresponding plate sending roller bed of the plate sending device; and step IV: moving the plate glass on the each layer of plate sending roller bed of the plate sending device one piece by one piece to a deep processing line or a stacking machine roller bed.

18. The three-dimensional conveying method for the plate glass production line as in claim 17, wherein in step II, before the plate glass is transferred, the plate receiving roller bed is positioned and stays at a docked conveying zero position of the plate receiving roller bed relative to the vertical roller bed according to a signal of a plate receiving roller bed zero-position switch, and the vertical roller bed is positioned and stays at a docked conveying zero position of the vertical roller bed relative to the plate receiving roller bed according to a signal of a first vertical roller bed zero-position switch.

19. The three-dimensional conveying method for the plate glass production line according to claim 17, wherein in step III, before the plate glass is transferred, the vertical roller bed is positioned and stays at a docked conveying zero position of the vertical roller bed relative to the plate sending roller bed according to a signal of a second vertical roller bed zero-position switch, and the plate sending roller bed is positioned and stays at a docked conveying zero position of the plate sending roller bed relative to the vertical roller bed according to a signal of a plate sending roller bed zero-position switch.

* * * * *